United States Patent
Kumar et al.

(10) Patent No.: US 9,760,381 B2
(45) Date of Patent: Sep. 12, 2017

(54) CONFIGURABLE TOOLBAR (75) Inventors: Darshan Kumar, San Ramon, CA (US); Ambili Sudhi, Bangalore (IN); Govindraja Achar, Bangalore (IN); Pankesh Jhaveri, North Brunswick, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 127 days.

(21) Appl. No.: 12/363,517

(22) Filed: Jan. 30, 2009

(65) Prior Publication Data

US 2010/0199194 A1    Aug. 5, 2010

(51) Int. Cl.
G06F 9/445    (2006.01)
G06F 9/44    (2006.01)
G06F 3/0482    (2013.01)

(52) U.S. Cl.
CPC ............. *G06F 9/4443* (2013.01); *G06F 8/38* (2013.01); *G06F 8/67* (2013.01); *G06F 3/0482* (2013.01)

(58) Field of Classification Search
CPC . G06F 8/00; G06F 9/4428; G06F 8/24; G06F 8/41; G06F 8/65; G06F 9/44521; G06F 8/38; G06F 8/67; G06F 9/4443; G06F 3/0482; H04L 41/0893
USPC .................................. 715/760, 762, 825, 845
See application file for complete search history.

(56) References Cited

U.S. PATENT DOCUMENTS

| | | | |
|---|---|---|---|
| 6,055,507 A | 4/2000 | Cunningham | |
| 6,085,184 A * | 7/2000 | Bertrand | G09B 7/04 706/45 |
| 6,161,176 A | 12/2000 | Hunter et al. | |
| 6,178,439 B1 | 1/2001 | Feit | |
| 6,188,401 B1 | 2/2001 | Peyer | |
| 6,229,537 B1 | 5/2001 | Sobeski et al. | |
| 6,292,792 B1 * | 9/2001 | Baffes | G06N 5/022 706/45 |
| 6,377,993 B1 | 4/2002 | Brandt et al. | |
| 6,430,591 B1 | 8/2002 | Goddard | |
| 6,453,302 B1 | 9/2002 | Johnson et al. | |
| 6,523,102 B1 | 2/2003 | Dye et al. | |
| 6,542,595 B1 | 4/2003 | Hemzal | |
| 6,624,831 B1 | 9/2003 | Shahine et al. | |
| 6,630,946 B2 | 10/2003 | Elliott et al. | |
| 6,636,863 B1 | 10/2003 | Friesen | |
| 6,683,943 B2 | 1/2004 | Wuelly | |
| 6,859,780 B1 | 2/2005 | Cunningham | |
| 6,944,829 B2 | 9/2005 | Dando et al. | |
| 6,952,681 B2 | 10/2005 | McQuade et al. | |

(Continued)

OTHER PUBLICATIONS

Blank et al. Flex Application Development. © 2008. Springer-Verlag. New York, NY. 483 pages.*

(Continued)

*Primary Examiner* — Amy M Levy (74) *Attorney, Agent, or Firm* — Miles & Stockbridge P.C.

(57) ABSTRACT

Systems and methods are provided that render a configurable toolbar. At runtime, a toolbar configuration file is loaded including a toolbar definition and at least one button definition. A rendering module renders a toolbar based on the toolbar configuration file. The toolbar configuration file is editable by an end-user, thus allowing the end-user to configure properties of the toolbar and buttons without knowledge of computer code or recompilation.

19 Claims, 6 Drawing Sheets

(56) References Cited

U.S. PATENT DOCUMENTS

| | | | |
|---|---|---|---|
| 6,963,826 B2 | 11/2005 | Hanaman et al. | |
| 6,990,454 B2 | 1/2006 | McIntosh | |
| 6,996,569 B1 | 2/2006 | Bedell et al. | |
| 7,058,890 B2 | 6/2006 | George et al. | |
| 7,107,548 B2 | 9/2006 | Shafron | |
| 7,179,751 B2 | 2/2007 | Smith et al. | |
| 7,219,127 B2 | 5/2007 | Huck et al. | |
| 7,222,305 B2 | 5/2007 | Teplov et al. | |
| 7,240,070 B1 | 7/2007 | Man Cheng et al. | |
| 7,240,323 B1* | 7/2007 | Desai | G06F 8/38 707/999.101 |
| 7,243,336 B2 | 7/2007 | Brockway et al. | |
| 7,249,053 B2 | 7/2007 | Wohlers et al. | |
| 7,406,534 B2 | 7/2008 | Syvanne et al. | |
| 7,467,355 B1 | 12/2008 | Zukowski et al. | |
| 7,590,939 B2 | 9/2009 | Sareen et al. | |
| 7,679,637 B1 | 3/2010 | Kohler | |
| 7,707,513 B2 | 4/2010 | Broda et al. | |
| 7,805,334 B1 | 9/2010 | Huppert | |
| 7,827,481 B1 | 11/2010 | Greenfield et al. | |
| 7,836,403 B2* | 11/2010 | Viswanathan | G06F 9/4443 379/142.01 |
| 7,956,869 B1 | 6/2011 | Gilra | |
| 8,020,083 B1 | 9/2011 | Kembel et al. | |
| 8,229,969 B1 | 7/2012 | Floyd | |
| 2001/0044731 A1 | 11/2001 | Coffman et al. | |
| 2002/0032501 A1 | 3/2002 | Tilles et al. | |
| 2002/0032582 A1 | 3/2002 | Feeney et al. | |
| 2002/0065683 A1 | 5/2002 | Pham et al. | |
| 2002/0085020 A1* | 7/2002 | Carroll, Jr. | G06F 8/38 715/700 |
| 2002/0116418 A1* | 8/2002 | Lachhwani | G06F 17/212 715/244 |
| 2002/0133520 A1 | 9/2002 | Tanner | |
| 2002/0169795 A1 | 11/2002 | Elliott et al. | |
| 2002/0173990 A1 | 11/2002 | Marasco | |
| 2002/0188513 A1 | 12/2002 | Gil et al. | |
| 2003/0004840 A1 | 1/2003 | Gharavy | |
| 2003/0040953 A1 | 2/2003 | Kasler et al. | |
| 2003/0055713 A1 | 3/2003 | Pinto et al. | |
| 2003/0066032 A1 | 4/2003 | Ramachandran et al. | |
| 2003/0088442 A1 | 5/2003 | Michael et al. | |
| 2003/0123631 A1 | 7/2003 | Moss et al. | |
| 2003/0144857 A1 | 7/2003 | Lacour et al. | |
| 2003/0158947 A1 | 8/2003 | Bloch et al. | |
| 2003/0189593 A1* | 10/2003 | Yarvin | G06F 17/30905 715/762 |
| 2003/0197366 A1 | 10/2003 | Kusterbeck | |
| 2003/0222904 A1* | 12/2003 | Allor | G06F 9/4443 715/744 |
| 2003/0226111 A1 | 12/2003 | Wirts et al. | |
| 2004/0017397 A1* | 1/2004 | Bach | G06F 9/4443 715/762 |
| 2004/0024740 A1 | 2/2004 | McGeorge | |
| 2004/0032431 A1* | 2/2004 | Hymes | G06F 9/4443 715/779 |
| 2004/0041841 A1* | 3/2004 | LeMogne | G06F 3/0481 715/777 |
| 2004/0046789 A1* | 3/2004 | Inanoria | G06F 8/38 715/748 |
| 2004/0056894 A1* | 3/2004 | Zaika et al. | 345/762 |
| 2004/0113934 A1 | 6/2004 | Kleinman et al. | |
| 2004/0138965 A1 | 7/2004 | Laughlin et al. | |
| 2004/0139176 A1* | 7/2004 | Farrell | H04L 67/06 709/220 |
| 2004/0141004 A1 | 7/2004 | Cabezas et al. | |
| 2004/0141016 A1 | 7/2004 | Fukatsu et al. | |
| 2004/0187127 A1 | 9/2004 | Gondi et al. | |
| 2004/0205343 A1 | 10/2004 | Forth et al. | |
| 2004/0225528 A1 | 11/2004 | Brock | |
| 2004/0254922 A1* | 12/2004 | Vincent, III | G06F 17/30923 |
| 2004/0255232 A1 | 12/2004 | Hammond et al. | |
| 2004/0267813 A1* | 12/2004 | Rivers-Moore | G06F 17/2247 |
| 2005/0039139 A1 | 2/2005 | Schwartz et al. | |
| 2005/0065756 A1 | 3/2005 | Hanaman et al. | |
| 2005/0076330 A1* | 4/2005 | Almgren | G06F 9/4443 717/113 |
| 2005/0102192 A1 | 5/2005 | Gerrits et al. | |
| 2005/0108044 A1 | 5/2005 | Koster | |
| 2005/0108295 A1 | 5/2005 | Karimisetty et al. | |
| 2005/0125806 A1 | 6/2005 | Bussler et al. | |
| 2005/0172262 A1* | 8/2005 | Lalwani | G06F 3/0481 717/109 |
| 2005/0198220 A1* | 9/2005 | Wada | G06F 17/30899 709/220 |
| 2005/0262481 A1* | 11/2005 | Coulson | G06F 9/4443 717/120 |
| 2006/0010397 A1 | 1/2006 | Laffey | |
| 2006/0041879 A1* | 2/2006 | Bower | G06F 9/4443 717/162 |
| 2006/0069785 A1 | 3/2006 | Barrett | |
| 2006/0074775 A1 | 4/2006 | Roman et al. | |
| 2006/0085449 A1 | 4/2006 | Sattler et al. | |
| 2006/0122971 A1 | 6/2006 | Berg et al. | |
| 2006/0129432 A1 | 6/2006 | Choi et al. | |
| 2006/0136843 A1 | 6/2006 | Shafron | |
| 2006/0190809 A1 | 8/2006 | Hejna, Jr. | |
| 2006/0247968 A1 | 11/2006 | Kadry | |
| 2006/0293930 A1 | 12/2006 | Rodgers et al. | |
| 2006/0294468 A1 | 12/2006 | Sareen et al. | |
| 2007/0016869 A1* | 1/2007 | Mukundan | G06F 9/4443 715/744 |
| 2007/0016876 A1 | 1/2007 | Schultz | |
| 2007/0055936 A1* | 3/2007 | Dhanjal | G06F 17/227 715/700 |
| 2007/0186167 A1 | 8/2007 | Anderson | |
| 2007/0192192 A1 | 8/2007 | Haberman et al. | |
| 2007/0192410 A1 | 8/2007 | Liversidge et al. | |
| 2007/0203785 A1 | 8/2007 | Thompson et al. | |
| 2007/0203851 A1 | 8/2007 | Sudhi | |
| 2007/0220039 A1 | 9/2007 | Waldman et al. | |
| 2007/0226027 A1 | 9/2007 | Chang | |
| 2007/0226082 A1 | 9/2007 | Leal | |
| 2007/0283287 A1 | 12/2007 | Taylor et al. | |
| 2007/0294612 A1 | 12/2007 | Drucker et al. | |
| 2008/0075251 A1 | 3/2008 | Jefferson et al. | |
| 2008/0077941 A1* | 3/2008 | Holmes | G06F 9/543 719/326 |
| 2008/0103821 A1 | 5/2008 | Cerbone et al. | |
| 2008/0103856 A1 | 5/2008 | Ciszkowski et al. | |
| 2008/0109286 A1 | 5/2008 | Johnson et al. | |
| 2008/0114709 A1 | 5/2008 | Dixon et al. | |
| 2008/0126179 A1* | 5/2008 | Norfolk | G06Q 30/0203 705/7.32 |
| 2008/0134077 A1* | 6/2008 | Cheng et al. | 715/781 |
| 2008/0140449 A1 | 6/2008 | Hayes | |
| 2008/0172603 A1 | 7/2008 | Agarwal et al. | |
| 2008/0184157 A1* | 7/2008 | Selig | 715/781 |
| 2008/0195504 A1 | 8/2008 | Wren | |
| 2008/0250433 A1 | 10/2008 | Orton et al. | |
| 2008/0255886 A1 | 10/2008 | Unkefer et al. | |
| 2008/0271059 A1 | 10/2008 | Ott et al. | |
| 2008/0281783 A1* | 11/2008 | Papkoff | G06F 17/30029 |
| 2008/0320509 A1 | 12/2008 | Gustafson et al. | |
| 2009/0024647 A1 | 1/2009 | Hein | |
| 2009/0077170 A1 | 3/2009 | Milburn et al. | |
| 2009/0125850 A1 | 5/2009 | Karstens | |
| 2009/0125907 A1 | 5/2009 | Wen et al. | |
| 2009/0172564 A1 | 7/2009 | Fish | |
| 2009/0210796 A1 | 8/2009 | Bhogal et al. | |
| 2009/0214034 A1* | 8/2009 | Mehrotra | H04L 51/063 380/255 |
| 2009/0248646 A1 | 10/2009 | Probst et al. | |
| 2009/0249290 A1* | 10/2009 | Jenkins | G06F 9/4443 717/109 |
| 2009/0254828 A1 | 10/2009 | Denoue et al. | |
| 2009/0265255 A1* | 10/2009 | Jackson et al. | 705/27 |
| 2009/0282041 A1 | 11/2009 | Skaria et al. | |
| 2009/0305217 A1 | 12/2009 | Mulcahy et al. | |
| 2009/0327934 A1 | 12/2009 | Serpico et al. | |
| 2010/0037168 A1* | 2/2010 | Thayne et al. | 715/769 |
| 2010/0049699 A1 | 2/2010 | Benschoter et al. | |

(56) References Cited

U.S. PATENT DOCUMENTS

| | | | |
|---|---|---|---|
| 2010/0088618 A1* | 4/2010 | Mayer-Ullmann | G06F 8/38 715/763 |
| 2010/0114985 A1 | 5/2010 | Chaudhary et al. | |
| 2010/0151846 A1 | 6/2010 | Vuong | |
| 2010/0161713 A1 | 6/2010 | Gangadharappa et al. | |
| 2010/0332227 A1 | 12/2010 | Melamed et al. | |
| 2012/0030553 A1* | 2/2012 | Delpha | G06F 17/30029 715/205 |

OTHER PUBLICATIONS

U.S. Appl. No. 12/363,385, Darshan Kumar.
U.S. Appl. No. 12/362,409, Darshan Kumar.
U.S. Appl. No. 12/363,402, Darshan Kumar.
U.S. Appl. No. 12/362,398, Darshan Kumar.
U.S. Appl. No. 12/362,416, Darshan Kumar.
U.S. Appl. No. 12/362,406, Darshan Kumar.
U.S. Appl. No. 12/363,411, Darshan Kumar.
U.S. Appl. No. 12/363,371, Darshan Kumar.
Oracle, "Siebel Mobile Solutions," Oracel Data Sheet, 2007, pp. 1-4.
Non-Final Office Action dated Dec. 7, 2010 in U.S. Appl. No. 12/363,371.
U.S. Office Action U.S. Appl. No. 12/362,406 dated Mar. 21, 2011.
U.S. Office Action U.S. Appl. No. 12/363,411 dated Mar. 31, 2011.
U.S. Office Action U.S. Appl. No. 12/363,371 dated Mar. 25, 2011.
"Boehringer Inglhein Holland Experiences Significant Increase in Customer Satisfaction in 12 Months Using Siebel Pharma", Business Wire, NY p. 1, Mar. 2004.
"Business Update; CSSC Completes Siebel Systems Validations for Three Pharmaceutical Firms", Health and Medicine Week, Atlanta, p. 346, May 25, 2006.
"Demantra Introduces Demantra Suite 4.0—Software That Offers Ten Times Return on Investment by Managing Product Demand"; Business Wire, NY, p. 1, Apr. 2, 2001.
"iAnywhere Prescribes Mobile Technology to Eli Lily's Italian Sales Team", PR Newswire, NY, p. 1, Mar. 22, 2004.
"Novo Nordisk Expands Siebel Pharma Deployment to Optimize European Sales Effectiveness", Business Wire, NY, p. 1, May 2003.
Oracle Licenses CIC's of eSignature Technology for Siebel Handheld for Pharma and Siebel Handheld for Service, PR Newswire, NY, Jan. 9, 2007.
Siebel Life Sciences Guide, Version 7.8, Rev. A Sep. 2005 pp. 1-108 http://www.erp100.com/document/Siebel/Version7.8/B31104_01/books/PDF/LSSIA.pdf.
Siebel Pharma Dynamic Sales for Pharmaceutical Biotechnology Companies, An Oracle White Paper, Customer Relationship Management and Business Analytics, Jun. 2006 http://www.oracle.com/us/industries/life-sciences/042929.pdf.
Siebel Pharma Handheld Guide, Version 7-7, Siebel Systems, Jun. 2004.
Siebel Pharma Handheld Guide, Version 7-8, May 2005 http://download.oracle.com/docs/cd/B31104_02/books/PDF/HHPharm.pdf.
Siebel Systems Inc., Siebel Enterprise Applications, Siebel Interactive Guide, Siebel 99, Version 5-5, 10PA1-A101-05500, Jun. 1999.
Siebel Life Sciences Guide, Version 7.8, Rev. A Sep. 2005 pp. 109-230 http://www.erp100.com/document/Siebel/Version7.8/B31104_01/books/PDF/LSSIA.pdf.
Siebel Life Sciences Guide, Version 7.8, Rev. A Sep. 2005 pp. 231-358 http://www.erp100.com/document/Siebel/Version7.8/B31104_01/books/PDF/LSSIA.pdf.
Siebel Life Sciences Guide, Version 7.8, Rev. A Sep. 2005 pp. 359-464 http://www.erp100.com/document/Siebel/Version7.8/B31104_01/books/PDF/LSSIA.pdf.
Office Action dated Jun. 8, 2011 issued in U.S. Appl. No. 12/362,409.
Kunau, Timothy M., "Enterprise Architecture, Life Sciences, and Visualization", Oct. 4, 2006, 2 pages.
Oracle Siebel Life Sciences Guide, Version 7.7, Rev. C, Jun. 2007.
Oracle Siebel Life Sciences Guide, Version 7.8, Rev. C, May 2008.
Oracle Siebel Pharma Handheld Guide, Version 8.0, Rev. A, May 2007.
Oracle Data Sheet, "Siebel Mobile Solutions," Copyright 2007.
Oracle White Paper, "Oracle CRM for Life Sciences—Closed Loop Marketing Solution for the Pharmaceutical Sales Model," Copyright 2009.
Oracle White Paper, "Siebel Pharma Dynamic Sales Solution," Copyright 2006.
"The Telemarketing Sales Rule," published by Consumers a Helpful Guide on Sep. 1, 2005, pp. 1-2 of 2.
"Data Services Made Easy for Adobe Flex Applications," Sep. 23, 2007, http://ajax.sys-con.com/node/418939/print.
Oracle Quality Implementation Guide, Release 12, Part No. B31579-01, Dec. 2006 http://docs.oracle.com/cd/B34956_01/current/acrobat/120qaig.pdf.

* cited by examiner

CONFIGURABLE TOOLBAR

FIELD OF THE INVENTION

One embodiment is directed to user interfaces, and more particularly directed to a configurable toolbar for a customer relationship management application user interface.

BACKGROUND INFORMATION

In recent years, the annual rate of increase among physicians has remained relatively flat while the number of pharmaceutical sales representatives has grown considerably overall, even accounting for recent reductions in field force sizes. As a result, sales call effectiveness has waned in the face of a changing market and physicians' increasingly busy schedules, forcing life sciences organizations to transform their sales and marketing capabilities. Pharmaceutical companies face stiff challenges in terms of completion, cost escalation and reduction in margins, while promoting their products by sending out sales representatives to doctors, hospitals and other medical organizations. Typically the sales representatives, in the few minutes that they get with the audience/doctors, orally explain the complicated details of the medical product and then give handouts, such as presentation material on the product in paper form. A very likely result of such an approach is that after the session the audience would have already forgotten much, depending on the oral presentation skills of the representative, and the handouts will most likely be thrown away. A more effective approach would be to provide the sales representative with an animated presentation that would be more engaging for the little time allotted to the presentation. The sales representative could then use the user interface ("UI") of the presentation application to navigate through the presentation in an engaging and informative manner.

In a typical UI toolbar, toolbar buttons are individually configured for event handling. For example, a toolbar might include a "Details" button to provide more information about what is displayed in a particular screenshot. If a developer wants to change the type of information displayed when "Details" is pressed, the developer must make those changes in the code and recompile the code. This manual reconfiguration leads to duplicative efforts and increased complexity, as well as decreased code reuse. Manual reconfiguration also prevents an end-user from reconfiguring the toolbar.

SUMMARY OF THE INVENTION

One embodiment is a system for rendering a configurable toolbar. The system loads a toolbar configuration file at runtime. This toolbar configuration file includes a toolbar definition and at least one button definition. The system then renders the toolbar at runtime based on the toolbar configuration file. The toolbar configuration file may be a file editable by an end-user (e.g., an extensible Markup Language ("XML") file), and thus reconfigured and reloaded for the next runtime instance.

DETAILED DESCRIPTION

Systems and methods are provided that render a configurable toolbar. At runtime, a toolbar configuration file contains a toolbar definition and at least one button definition. A rendering module renders a toolbar based on the toolbar configuration file. The toolbar configuration file is editable by an end-user, thus allowing the end-user to configure properties of the toolbar and buttons without knowledge of computer code or recompilation.

Figure 1:
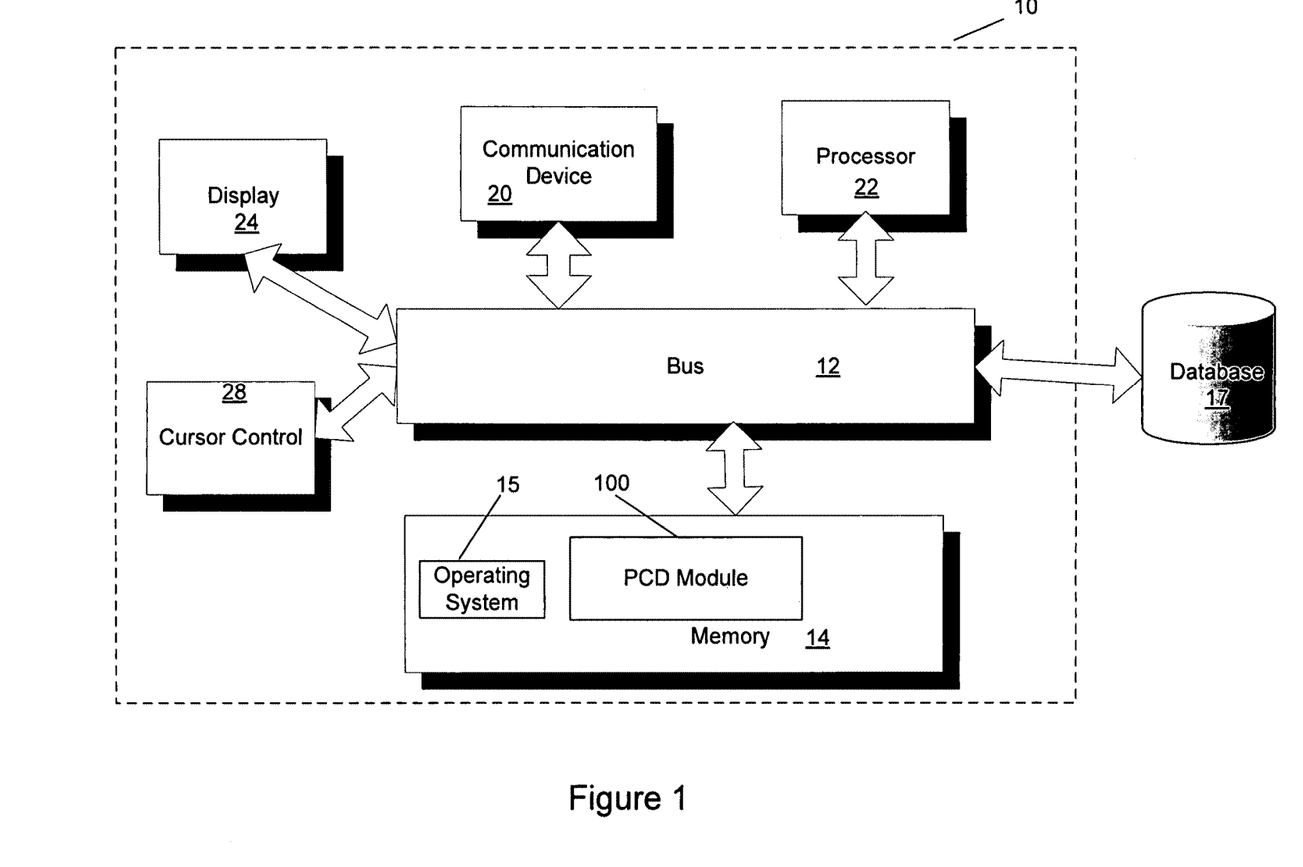
FIG. 1 is a block diagram of a system that can implement a personalized content delivery ("PCD") system in accordance with an embodiment.

FIG. 1 is a block diagram of a system 10 that can implement an embodiment of a PCD system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A cursor control device 28, such as a touch screen, is further coupled to bus 12 to enable a user to interface with system 10. In one embodiment, system 10 is a tablet PC.

In one embodiment, memory 14 stores software modules that provide functionality when executed by processor 22. The modules include an operating system 15 that provides operating system functionality for system 10. The modules further include a PCD module 100. This module is described in greater detail below. System 10 may further coupled to a database 17 for storing additional data.

Figure 2:
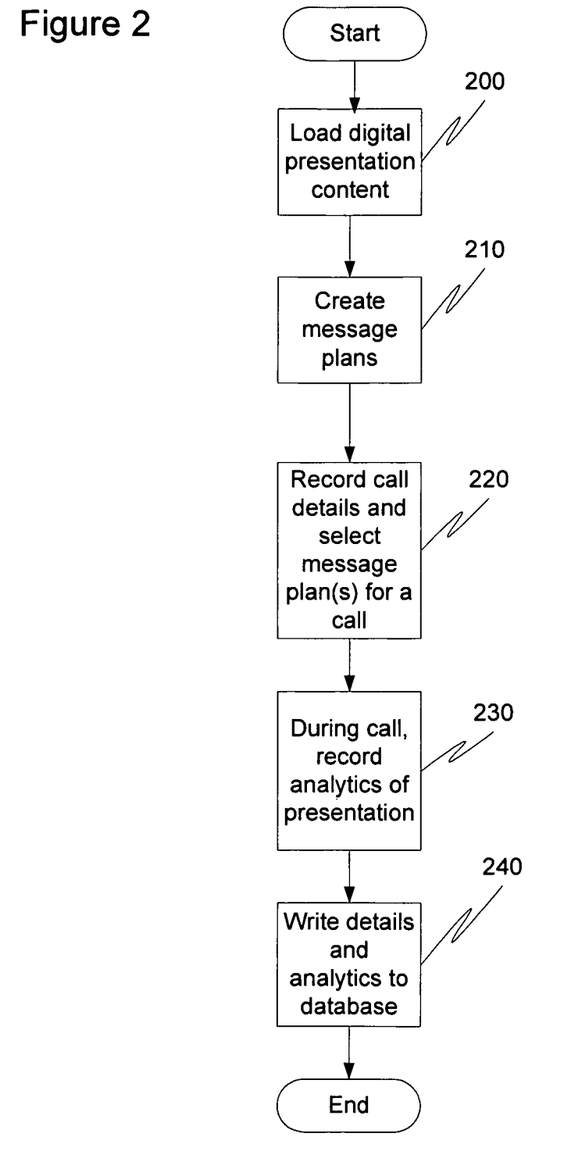
FIG. 2 illustrates a method of providing personalized content delivery and analytics in accordance with an embodiment.

FIG. 2 illustrates a flow diagram of the functionality of PCD module 100 in accordance with an embodiment. In one embodiment, the functionality of the flow diagram of FIG. 2, and FIG. 6 below, is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Initially, digital presentation content is loaded on the PCD system 10 (200). Digital presentation content may be used by brand managers, marketing managers and sales operation managers as a sales communication tool for more effective communication in order to acquire, retain and develop profitable customer relationships and improve marketing and sales effectiveness. Examples of digital presentation content includes presentations in the form of Flash files, PowerPoint files, word documents, movie files, Portable Document files, etc. A "message" refers to a slide, page or segment of a presentation conveying a specific message that managers wish to track.

After loading the digital presentation content on PCD system 10, an administrator or manager may then create a "messaging plan" for the sales representative to use (210). The messaging plan is a sequence of digital presentation content used to deliver the tracked message regarding the product. When a sales representative makes a sales call, a messaging plan is selected on the PCD system 10 and details about the call are entered into the system (220). During the sales call, the PCD system 10 dynamically and automatically collects analytical data such as time spent by the sales representative on each presentation message and the sequence of the messages (230). For example, PCD system 10 may include a timer (not shown) for recording the time spent on each message or segment of the presentation.

Figure 3:
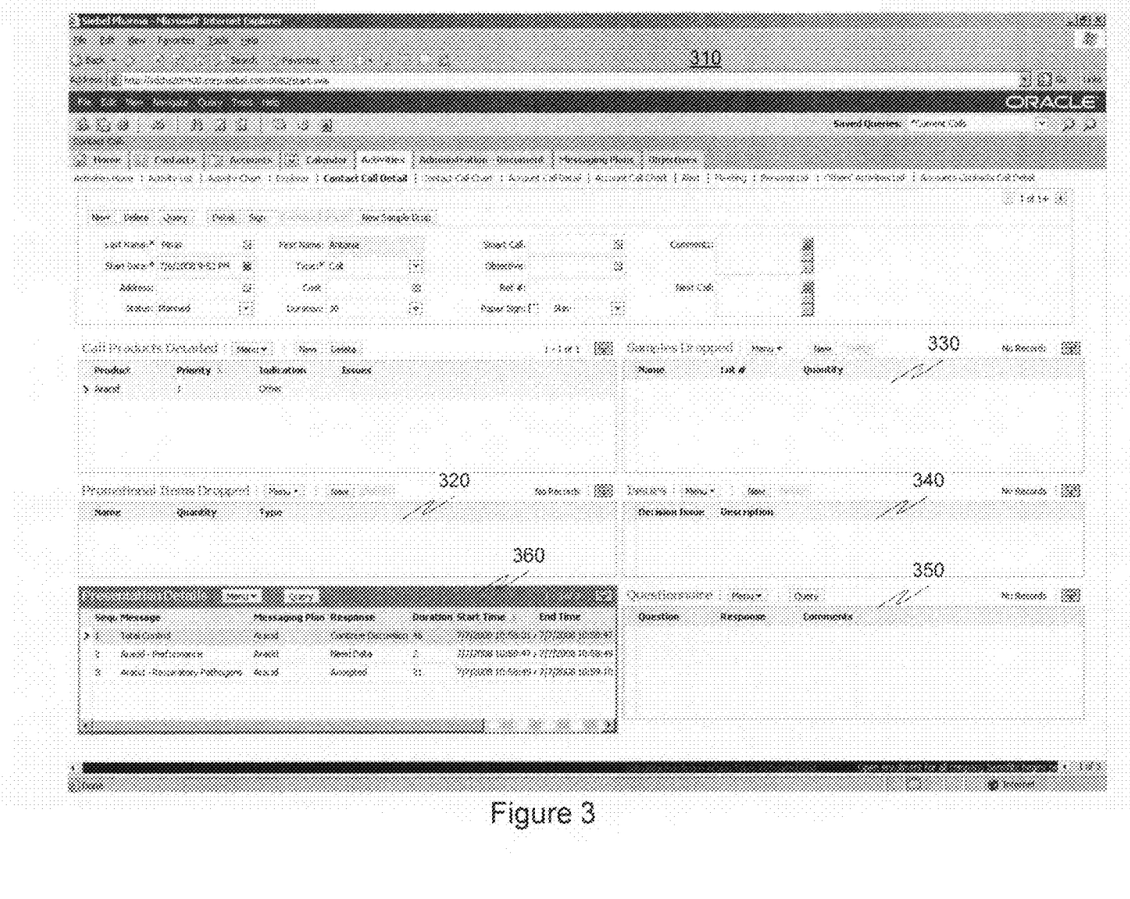
FIG. 3 illustrates example call details user interface ("UI") of the PCD system in accordance with an embodiment.

Once the sales presentation is over, the analytical data collected during the session is written back to database 17 (240). After the call, the sales representative may also enter additional details about the sales call such a samples and promotional items left with the doctor or audience, issues about the call, or questionnaires dropped during the call. FIG. 3 illustrates an example screenshot of a user interface ("UI") 310 for PCD system 10 where the sales representative can enter call details in promotional items section 320, samples dropped section 330, issues section 340, and questionnaires section 350. The screenshot UI 310 displays in presentation details section 360 the messages that were presented to the contact in the detailing session, the sequence of presented messages and their parent messaging plans (i.e., the message plan to which the messages belong), and duration of presentation of each message. Ultimately, information about the sales call and other sales calls regarding the same product may be used to develop marketing strategies for that product based on the success of the sales calls.

In one embodiment, the UIs for PCD system 10 are implemented using the Adobe Flex platform. Adobe Flex is a collection of technologies released by Adobe Systems for the development and deployment of cross platform rich Internet applications based on the proprietary Adobe Flash platform. Flex provides a workflow and programming model that is familiar to developers. Macromedia XML ("MXML"), an eXtensible Markup Language ("XML")-based markup language, offers a way to build and lay out graphic user interfaces. Interactivity is achieved through the use of ActionScript, the core language of Flash Player that is based on the European Computer Manufacturers Association ("ECMA") ECMAScript standard. The Flex software development kit ("SDK") comes with a set of user interface components including buttons, list boxes, trees, data grids, several text controls, charts, graphs and various layout containers. Other features like web services, drag and drop, modal dialogs, animation effects, application states, form validation, and other interactions round out the application framework.

A Flex application may be a rich internet application ("RIA"). RIAs introduce an intermediate layer of code, often called a client engine, between the user and the server. This client engine is typically downloaded as part of the instantiation of the application, and may be supplemented by further code downloads as use of the application progresses. The client engine acts as an extension of the browser, and usually takes over responsibility for rendering the application's user interface and for server communication. What can be done in a RIA may be limited by the capabilities of the system used on the client, but in general, the client engine is programmed to perform application functions that its designer believes will enhance some aspect of the user interface, or improve its responsiveness when handling certain user interactions, compared to a standard Web browser implementation. Also, while simply adding a client engine does not force an application to depart from the normal synchronous pattern of interactions between browser and server, in most RIAs the client engine performs additional asynchronous communications with servers.

In a multi-tiered model, Flex applications serve as the presentation tier. Unlike page-based Hypertext Markup Language ("HTML") applications, Flex applications provide a stateful client where significant changes to the view don't require loading a new page. Similarly, Flex and Flash Player provide many useful ways to send and load data to and from server-side components without requiring the client to reload the view. To incorporate a Flex application into a website, one typically embeds Shockwave Flash (.SWF) file in an HTML, JavaServer Pages ("JSP"), Adobe, ColdFusion, or other type of web page. The page that embeds the SWF file is known as the wrapper. A wrapper consists of an <object> tag and an <embed> tag that format the SWF file on the page, define data object locations, and pass run-time variables to the SWF file. In addition, the wrapper can include support for history management and Flash Player version detection and deployment.

Figure 4:
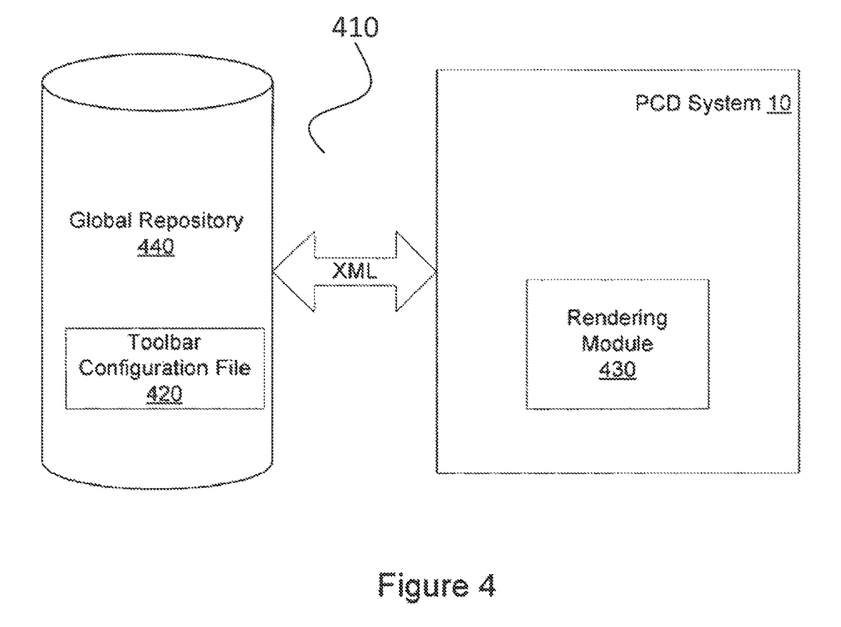
FIG. 4 illustrates an example presentation UI in accordance with an embodiment.

The use of Flex provides a rich UI for PCD system 10. An important part of a UI for PCD system 10, or any UI, is the toolbar with which the user navigates the UI. Unlike conventional UIs that are not reconfigurable or reusable, PCD system 10 includes a centralized toolbar framework where toolbars are configurable by users and developed as generic framework that can be reused in other Flex UI applications. FIG. 4 illustrates a toolbar framework 410 for PCD system 10 in accordance with an embodiment. Toolbar framework 410 includes at least one toolbar configuration file 420 and a toolbar rendering module 430 in PCD system 10. Toolbar configuration file 420 may be an XML file that hold the definitions and configurations for each toolbar and associated buttons that are to be rendered in a PCD system UI, for example, presentation UI 410. Toolbar configuration file 420 may be stored in global repository 440, which may be located locally in database 17 or may be accessed remotely over a network.

An example toolbar configuration file 420, toolbar_buttons.xml, is shown below:

```
<toolbars>
    <toolbar toolbarId="Detailer - Standard"
        defaultState="DEFAULT"
    firstChangeInternal="false" buttonId="1">
        <respectStates>
```

-continued

```
        <toolbar name="Detailer - Standard"/>
    </respectStates>
    <button buttonId="3">
        <label/>
        <toolTip>IDS_UNLOCK_VIEW</toolTip>
        <icon/>
        <disabledIcon>DS_Unlock_disabled</disabledIcon>
        <downIcon>DS_Unlock_down</downIcon>
        <upIcon>DS_Unlock_up</upIcon>
        <overIcon>DS_Unlock_over</overIcon>
        <selectedDisabledIcon>DS_Unlock_sdisabled</selectedDisabledIcon>
        <selectedDownIcon>DS_Unlock_sdown</selectedDownIcon>
        <selectedUpIcon>DS_Unlock_sup</selectedUpIcon>
        <selectedOverIcon>DS_Unlock_sover</selectedOverIcon>
        <type>ISDButton</type>
        <onHover/>
        <disablestates>
            <state name="DEFAULT"/>
            <state name="READONLY"/>
            <state name="WHITEBOARD_ON"/>
            <state name="WHITEBOARD_OFF"/>
            <state name="WHITEBOARD_ON_1"/>
            <state name="WHITEBOARD_ON_2"/>
        </disablestates>
        <event name="eventUnLock" state="LOCKED" propogateTo="ALL_CONTAINERS" restorePrevState="true"/>
        <height>32</height>
        <width>32</width>
        <readonlystates/>
        <readonly/>
        <shortcutKey>ctrl+6</shortcutKey>
    </button>
    ........................
    </toolbar>
    ........................
</toolbars>
```

As seen in the above toolbar configuration file XML structure, each button definition has configurable properties such as a shortcut key, label, tooltip (text displayed when the mouse pointer hovers over the button), icons for various button states, etc. In Flex code, button definitions in toolbar_buttons.xml file mentioned above are read by objects of type ButtonObj. The method "public function ButtonObj::fill(xmlString:String,parToolbarId:String):void" accepts as input a button definition (<button> . . . </button>) as an XML string and a toolbar ID, and maps the properties of button (e.g., label, height, width, tooltip, event to fire, disabled states, readable states, etc.) to member variables of the method.

Similarly, toolbar definitions in toolbar_buttons.xml are read by objects of type ToolbarObj. The method "public function Tool barObj::fill(xmlString:String):void" accepts as input a toolbar definition (<toolbar> . . . </toolbar>) as an XML string and maps the properties of the toolbar (e.g., included buttons, button direction, etc.) to member variables of that method, and also creates and holds objects of type ButtonObj for each button definition in the toolbar. A Flex application in PCD system 10 has a global object of type ToolbarRepository, which maintains a repository of all toolbar definitions required by that application. This object reads toolbar_buttons.xml, and for each toolbar definition in the XML file, creates an object of type ToolbarObj.

In Flex code objects of type ToolbarRepository, ToolbarObj and ButtonObj hold the toolbar definitions as read from toolbar_buttons.xml file, and toolbar rendering module 430 reads the objects to render the toolbar in a Flex-based UI. In the toolbar rendering module 430, objects of type ISDButton and ToolbarContainer display the toolbar buttons in a Flex-based UI based on these objects.

An ISDButton object accepts a button definition (i.e., object of type ButtonObj) as input, and based on the properties specified in definition renders the button in a UI. A ToolbarContainer object accepts a toolbar ID as input and retrieves the definition of that toolbar (i.e., an object of type ToolbarObj), and based on the properties specified in definition renders the toolbar in a UI.

When a toolbar is to be rendered in a UI, a toolbar definition is picked from the ToolbarRepository based on a toolbar ID, and the ISDButton and ToolbarContainer classes render the toolbar buttons based on the definition. Example code for this rendering is shown below:

```
//Instantiate a toolbar container
var tb:ToolbarContainer = new ToolbarContainer( );
//set the dataprovider of toolbar container to the required
//toolbar ID where the ID is "Whiteboard"
tb.dataProvider = "Whiteboard";
```

Figure 5:
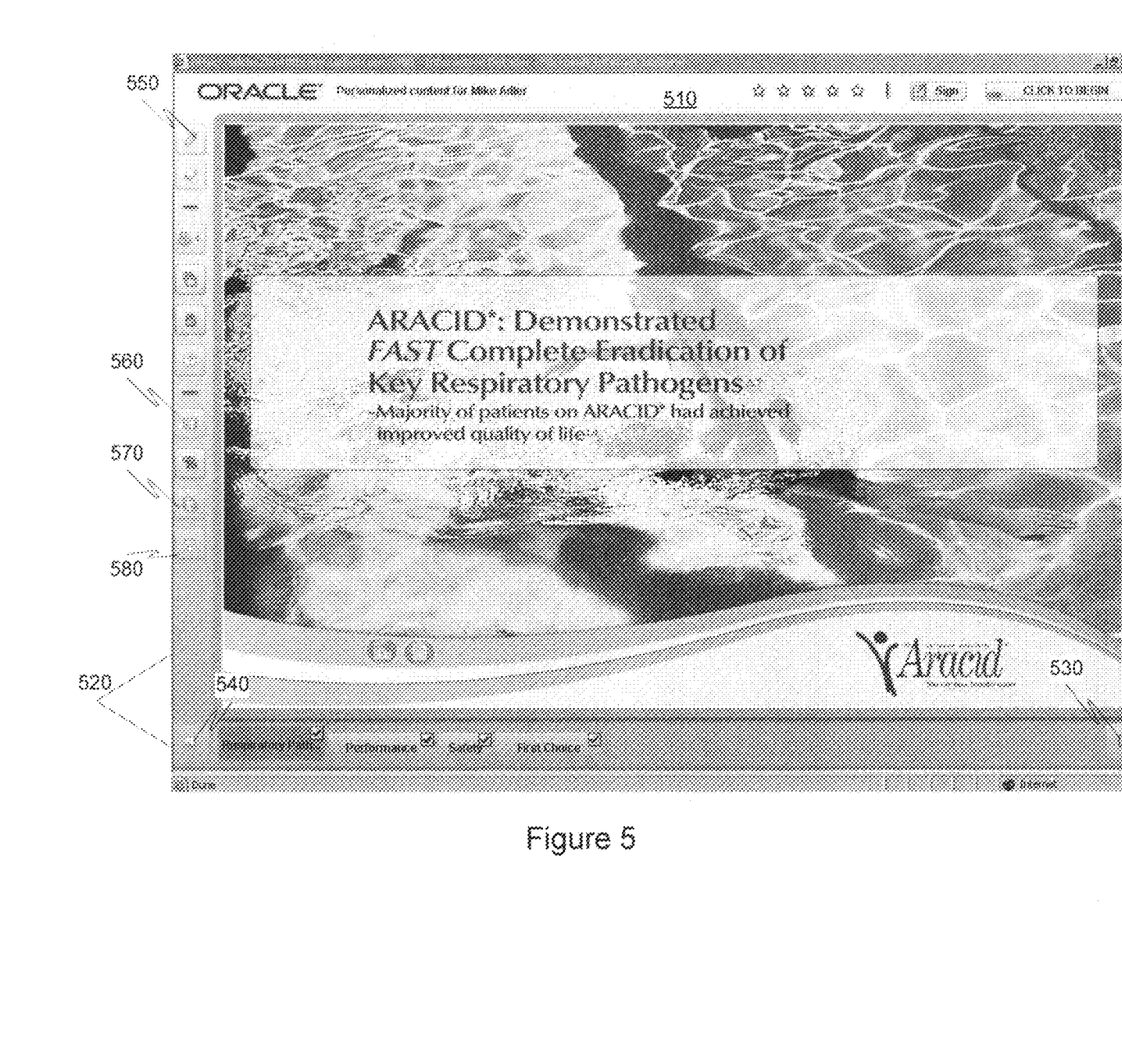
FIG. 5 illustrates a configurable toolbar framework in accordance with an embodiment.

FIG. 5 illustrates an example screenshot of presentation UI 510 that includes a configurable toolbar 520 that provides quick navigation to users. The toolbar 520 includes, for example, next button 530 and previous button 540 for navigating between messages in a messaging plan, markup button 550 to highlight or mark areas in a message, questionnaire button 560 to display a questionnaire related to the message, detailed message button 570 to display messages giving further details on the message being presented, and related messages button 580 to display list of messages related to the message being presented.

Figure 6:
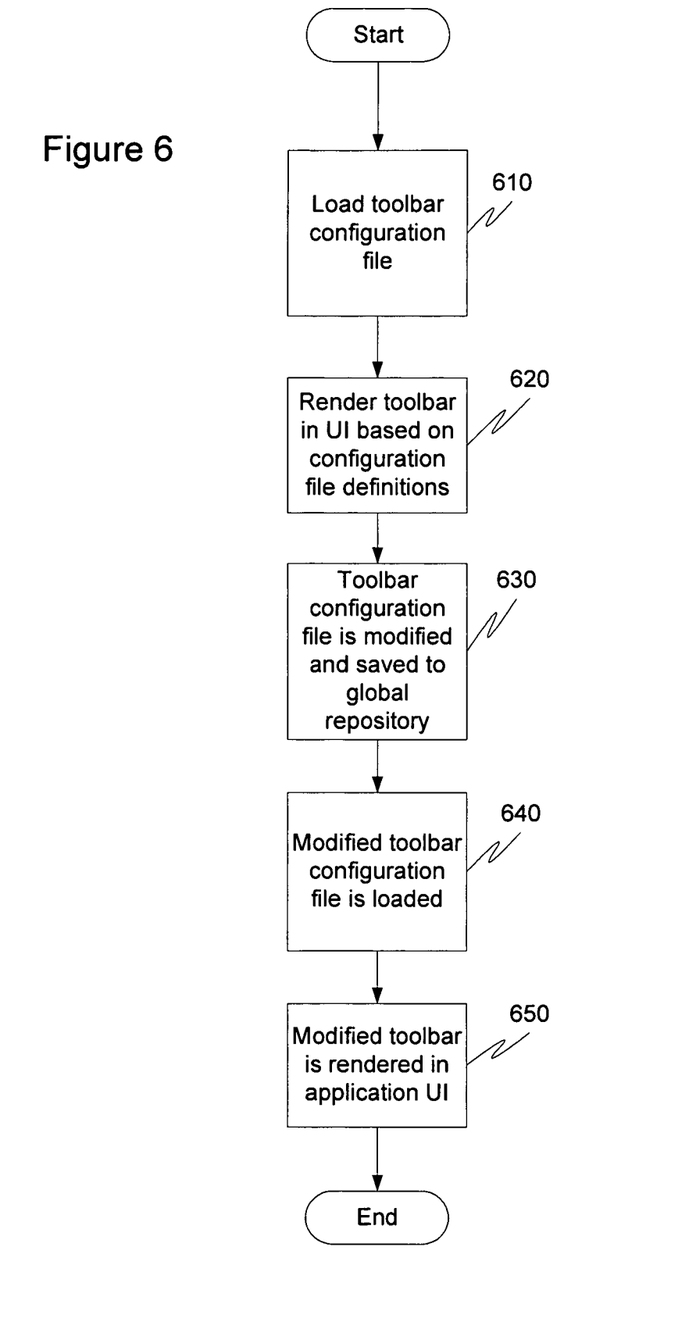
FIG. 6 illustrates a method of rendering a configurable toolbar in accordance with an embodiment.

FIG. 6 illustrates a flow diagram of the functionality of PCD system 10 and a configurable toolbar framework in accordance with an embodiment. At runtime, a toolbar configuration file 420 for a Flex application UI is loaded from global repository 440 (610). Rendering module 430 reads toolbar and button definitions from the toolbar configuration file 420, and renders a toolbar in a Flex application UI, e.g., presentation UI 510, based on the toolbar and button definitions (620). An end-user later modifies toolbar configuration file 420 (e.g., to remove a button from the toolbar), and the modified toolbar configuration file 420 is saved back in the global repository 440 (630). The end-user here may be an administrator for the application, or anyone familiar with XML. To remove a button, for example, the end-user merely deletes the text between the <button> and </button> tags, including the tags themselves. Unlike typical toolbars, this removal or any other modification of the toolbar is achieved without editing source code and recompiling the application. Thus, at runtime and without recompilation, the modified toolbar configuration file 420 is loaded from global repository 440 (640). Rendering module 430 reads toolbar and button definitions from the modified toolbar configuration file 420, and renders a modified toolbar in a Flex application UI (e.g., a toolbar with one less button) (650).

Accordingly, end-users may modify toolbar configuration file 420 to change icons for toolbar buttons and for the various states of the button (e.g., the icon to be used when button is in disabled state, the icon to use when button is selected, the icon to use when mouse hovers over the button, etc.). End-users may configure the height/width and shape of button (e.g., rounded corners, sharp corners, etc.). With the configurable toolbar framework, end-users may also configure the event fired by the button when clicked, and the states in which the button should become disabled or read-only. End-users can configure shortcut keys for the button or the tooltip for each button (including the language for that text), and may add or remove one or more buttons to/from a toolbar.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method for rendering a configurable toolbar including at least one button, the method comprising:
   executing an application that implements a user interface for a personalized content delivery (PCD) system, the application presenting digital content to a viewer in the form of one or more messages;
   loading, by a rendering module of the PCD system, a toolbar configuration file from a global repository, the toolbar configuration file including a toolbar definition and a button definition, the toolbar definition including a pair of toolbar tags surrounding text that defines one or more properties of the configurable toolbar, and the button definition including a pair of button tags surrounding text that defines one or more properties of the button, the button definition including a markup button definition to highlight or mark areas in the message;
   storing, by the rendering module, the toolbar definition in a toolbar object of the application and the button definition in a button object of the application;
   rendering, by the rendering module, the configurable toolbar and the button in the application based on the toolbar definition and the button definition of the toolbar configuration file, including:
      calling a button method that accepts the button definition as input and maps the button properties to member variables of the button method, and
      calling a toolbar method that accepts the toolbar definition as input and maps the toolbar properties to member variables of the toolbar method; and
   after the toolbar configuration file is modified by an end-user to change one or more properties of the toolbar or the button by changing the text located between the toolbar tags or the text located between the button tags in the toolbar configuration file, to remove the button from the toolbar by removing the button tags and the text therebetween from the toolbar configuration file, or to add a new button to the toolbar by adding button tags and text therebetween to the toolbar configuration file, and without recompilation of the application:
      loading, by the rendering module, the modified toolbar configuration file,
      storing, by the rendering module, the toolbar definition of the modified toolbar configuration file in the toolbar object of the application and the button definition of the modified toolbar configuration file in the button object of the application, and
      rendering, by the rendering module, a modified configurable toolbar in the application based on the toolbar definition and the button definition of the modified toolbar configuration file.

2. The method of claim 1, wherein the application comprises a Flex application user interface ("UI").

3. The method claim 1, wherein the toolbar configuration file is in eXtensible Markup Language ("XML") format.

4. The method of claim 1,
   wherein the properties of the button include at least one of:
      a height and width of the button;
      a shape for corners of the button;
      a tooltip of the button;
      a label for the button;
      an icon for the button;
      a shortcut key for the button;
      an action to perform upon selection of the button; and
      a disabled state for the button, and
   wherein the button definition further includes at least one of:
      a questionnaire button definition to display a questionnaire related to the message,
      a detailed message button definition to display messages giving further details on the message being presented, and
      a related messages button definition to display a list of messages related to the message being presented.

5. The method of claim 1, wherein the toolbar configuration file is reusable by a plurality of applications with access to the global repository.

6. The method of claim 5, wherein changes to the toolbar configuration file are stored in the global repository.

7. The method of claim 1, wherein the properties of the toolbar include which buttons are included in the toolbar.

8. A non-transitory computer-readable medium having instructions stored thereon that, when executed by a processor, cause the processor to:
   execute an application that implements a user interface for a personalized content delivery (PCD) system, the application presenting digital content to a viewer in the form of one or more messages; and
   execute a rendering module of the PCD system that:
      loads a toolbar configuration file from a global repository, the toolbar configuration file including a toolbar definition and a button definition, the toolbar definition including a pair of toolbar tags surrounding text that defines one or more properties of the configurable toolbar, and the button definition including a pair of button tags surrounding text that defines one or more properties of the button, the button definition including a markup button definition to highlight or mark areas in the message,
      stores the toolbar definition in a toolbar object of the application and the button definition in a button object of the application,
      renders the configurable toolbar and the button in the application based on the toolbar definition and the button definition of the toolbar configuration file, including:
         calls a button method that accepts the button definition as input and maps the button properties to member variables of the button method, and
         calls a toolbar method that accepts the toolbar definition as input and maps the toolbar properties to member variables of the toolbar method, and
      after the toolbar configuration file is modified by an end-user to change one or more properties of the toolbar or the button by changing the text located between the toolbar tags or the text located between the button tags in the toolbar configuration file, to remove the button from the toolbar by removing the button tags and the text therebetween from the toolbar configuration file, or to add a new button to the toolbar by adding button tags and text therebetween to the toolbar configuration file, and without recompilation of the application:
  loads the modified toolbar configuration file,
  stores the toolbar definition of the modified toolbar configuration file in the toolbar object of the application and the button definition of the modified toolbar configuration file in the button object of the application, and
  renders a modified configurable toolbar in the application based on the toolbar definition and the button definition of the modified toolbar configuration file.

9. The non-transitory computer-readable medium of claim 8, wherein the application comprises a Flex application user interface ("UI").

10. The non-transitory computer-readable medium claim 8, the toolbar configuration file is in eXtensible Markup Language ("XML") format.

11. The non-transitory computer-readable medium of claim 8,
  wherein the properties of the button include at least one of:
    a height and width of the button;
    a shape for corners of the button;
    a tooltip of the button;
    a label for the button;
    an icon for the button;
    a shortcut key for the button;
    an action to perform upon selection of the button; or
    a disabled state for the button, and
  wherein the button definition further includes at least one of:
    a questionnaire button definition to display a questionnaire related to the message,
    a detailed message button definition to display messages giving further details on the message being presented, and
    a related messages button definition to display a list of messages related to the message being presented.

12. The non-transitory computer-readable medium of claim 8, wherein the toolbar configuration file is reusable by a plurality of applications with access to the global repository.

13. The non-transitory computer-readable medium of claim 12, wherein changes to the toolbar configuration file are stored in the global repository.

14. The non-transitory computer-readable medium of claim 8, wherein the properties of the toolbar include which buttons are included in the toolbar.

15. A personalized content delivery (PCD) system, comprising:
  a memory storing a toolbar configuration file including a toolbar definition and a button definition, the toolbar definition including a pair of toolbar tags surrounding text that defines one or more properties of the configurable toolbar, and the button definition including a pair of button tags surrounding text that defines one or more properties of the button, the button definition including a markup button definition to highlight or mark areas in a message; and
  a processor, coupled to the memory, configured to execute an application and a rendering module,
  wherein the application implements a user interface that presents digital content to a viewer in the form of one or more messages, and
  wherein the rendering module:
    loads the toolbar configuration file from the memory,
    stores the toolbar definition in a toolbar object of the application and the button definition in a button object of the application,
    renders the configurable toolbar and the button in the application based on the toolbar definition and the button definition of the toolbar configuration file, including:
      calling a button method that accepts the button definition as input and maps the button properties to member variables of the button method, and
      calling a toolbar method that accepts the toolbar definition as input and maps the toolbar properties to member variables of the toolbar method, and
  wherein, after the toolbar configuration file is modified by an end-user to change one or more properties of the toolbar or the button by changing the text located between the toolbar tags or the text located between the button tags in the toolbar configuration file, to remove the button from the toolbar by removing the button tags and the text therebetween from the toolbar configuration file, or to add a new button to the toolbar adding button tags and text therebetween to the toolbar configuration file, and without recompilation of the application, the rendering module:
    loads the modified toolbar configuration file,
    stores the toolbar definition of the modified toolbar configuration file in the toolbar object of the application and the button definition of the modified toolbar configuration file in the button object of the application, and
    renders a modified configurable toolbar in the application based on the toolbar definition and the button definition of the modified toolbar configuration file.

16. The system of claim 15, wherein the application comprises a Flex application user interface ("UI") and the toolbar configuration file comprises an eXtensible Markup Language ("XML") file.

17. The system of claim 15,
  wherein the properties of the button include at least one of:
    a height and width of the button;
    a shape for corners of the button;
    a tooltip of the button;
    a label for the button;
    an icon for the button;
    a shortcut key for the button;
    an action to perform upon selection of the button; and
    a disabled state for the button, and
  wherein the button definition further includes at least one of:
    a questionnaire button definition to display a questionnaire related to the message,
    a detailed message button definition to display messages giving further details on the message being presented, and
    a related messages button definition to display a list of messages related to the message being presented.

18. The system of claim 15, wherein the toolbar configuration file is reusable by a plurality of applications with access to the memory.

19. The system of claim 15, wherein the properties of the toolbar include which buttons are included in the toolbar.

\* \* \* \* \*